US012725290B2

(12) United States Patent
Soe et al.

(10) Patent No.: US 12,725,290 B2
(45) Date of Patent: Sep. 1, 2026

(54) METHOD AND APPARATUS FOR ESTIMATING A BODY PART POSITION OF A PERSON

(71) Applicant: NEC Corporation, Tokyo (JP)

(72) Inventors: Ni Ni Soe, Singapore (SG); Charles Chi Hin Choy, Singapore (SG)

(73) Assignee: NEC CORPORATION, Tokyo (JP)

( * ) Notice: Subject to any disclaimer, the term of this patent is extended or adjusted under 35 U.S.C. 154(b) by 282 days.

(21) Appl. No.: 18/409,037

(22) Filed: Jan. 10, 2024

(65) Prior Publication Data

US 2024/0242371 A1 Jul. 18, 2024

(30) Foreign Application Priority Data

Jan. 18, 2023 (SG) .......................... 10202300154U

(51) Int. Cl.
*G06T 7/70* (2017.01)

(52) U.S. Cl.
CPC ...... *G06T 7/70* (2017.01); *G06T 2207/30196* (2013.01)

(58) Field of Classification Search
None
See application file for complete search history.

(56) References Cited

U.S. PATENT DOCUMENTS

2017/0061615 A1* 3/2017 Guo .................... A61B 5/4561
2019/0066327 A1 2/2019 Fujimoto et al.
2019/0347817 A1* 11/2019 Ferrantelli ............ G06N 3/084
2023/0240594 A1 8/2023 Ariga

FOREIGN PATENT DOCUMENTS

CN 104063677 B * 4/2019 ............... G06T 7/70
CN 115552487 A * 12/2022 ............... G06T 7/40
JP 7007777 B1 * 1/2022 ........... A61B 5/4566
JP 2022-045832 A 3/2022
WO 2017/187641 A1 11/2017

OTHER PUBLICATIONS

JP Office Action for JP Application No. 2023-195890, mailed on Dec. 3, 2024 with English Translation.
Miyuki Uematsu et al., "Improvement of a surgical navigation system by applying anatomical point-based registration on skin surface", WWLS 2010 Welfare, Wellbeing, Life Support, Sep. 18, 2010, pp. 443-446.

(Continued)

*Primary Examiner* — Vu Le
*Assistant Examiner* — Zaid Muhammad Saleh
(74) *Attorney, Agent, or Firm* — Sughrue Mion, PLLC

(57) ABSTRACT

The present disclosure provides a method and an apparatus for estimating a body part position of a person, the method comprising: detecting, by a processor, a plurality of body part positions of the person from an image in which the person is detected, wherein each of the plurality of body part positions corresponds to a body part of the person; and estimating, by the processor, a body part position of the person based on the detected plurality of body part positions.

9 Claims, 18 Drawing Sheets

(56) References Cited

OTHER PUBLICATIONS

Yukie Ueshima et al., "An Anatomical Study of the Projection Region of the Dome of the Pleura to the surface of the Anterior Neck. (Part II)", Journal of the Japan Society of Acupuncture and Moxibustion, vol. 44, No. 4, 1994, pp. 317-328.
Kiyoaki Sawai et al., "A Study on an Action Recognition from 2-Dimensional Images", IEICE technical report, vol. 102, No. 630, Feb. 4, 2003, pp. 59-64.
Amin Ahmadi Kasani et al., "Predict joint angle of body parts based on sequence pattern recognition", 2022 16th International Conference on Ubiquitous Information Management and Communication (IMCOM), Jan. 3, 2022.

* cited by examiner

700

Secondary memory 1610
Storage drive 1612
Removable storage drive 1614
Interface 1620
Removable storage medium 1618
Removable storage unit 1622
Display 1630
Display interface 1602
Speaker (s) 1634
Audio interface 1632
Communication infrastructure 1606
Processor 1604
Main memory 1608
Communication interface 1624
Communication path 1626
1600

METHOD AND APPARATUS FOR ESTIMATING A BODY PART POSITION OF A PERSON

INCORPORATION BY REFERENCE

This application is based upon and claims the benefit of priority from Singapore patent application No. 10202300154U, filed on Jan. 18, 2023, the disclosure of which is incorporated herein in its entirety by reference.

TECHNICAL FIELD

The present invention relates broadly, but not exclusively, to a method and an apparatus for estimating a body part position of a person.

BACKGROUND ART

Posture relates to the relative alignment of various body segments with one another. A good posture means that the body's alignment is balanced so that stress applied to the body segments is minimal, while poor posture means that the body's alignment is out of balance, causing unusual stresses to various body segments, which can lead to abnormal anatomical adaptations, alterations in performance, and less efficiency.

Postural analysis is an assessment of the function of the motor system (bones, muscles, and ligaments) and the nervous system's control of the motor system. More than just a bone and muscle assessment, it also covers spinal cord alignment. With postural analysis, it is possible to investigate correct standing alignment of a person from an anterior view, posterior view and lateral view of the person.

In postural analysis, experienced and skillful physiotherapists can assess a patient's posture with more accuracy and confidence, while junior physiotherapists might struggle to correctly and confidently assess the patient's posture. To date, there is some limitation in assessing posture such as manual assessment by identifying landmark on images, by placing reflected markers on a specific body position and utilizing a pressure mat under the foot of a patient.

Further, landmarks (e.g., anatomical points) of body, face and spinal cord are important to assess the overall posture deviation. Especially, spinal cord landmarks are manually provided by clinicians.

Herein disclosed are embodiments of a method and apparatus for estimating a body part position of a person that addresses one or more of the above problems.

Furthermore, other desirable features and characteristics will become apparent from the subsequent detailed description and the appended claims, taken in conjunction with the accompanying drawings and this background of the disclosure.

SUMMARY

In a first aspect, the present disclosure provides a method for estimating a body part position of a person, comprising: detecting, by a processor, a plurality of body part positions of the person from an image in which the person is detected, wherein each of the plurality of body part positions corresponds to a body part of the person; and estimating, by the processor, a body part position of the person based on the detected plurality of body part positions.

In a second aspect, the present disclosure provides an apparatus for estimating a body part position of a person, comprising: at least one processor; and at least one memory including computer program code: the at least one memory and the computer program code configured to, with at least one processor, cause the apparatus at least to: detect a plurality of body part positions of the person from an image in which the person is detected, wherein each of plurality of body part positions corresponds to a body part of the person; and estimate a body part position of the person based on one or more of the detected plurality of body part positions.

In a third aspect, the present disclosure provides a system for estimating a body part position of a person comprising the apparatus of the second aspect and one or more image capturing apparatuses configured to capture one or more images of the person, wherein the one or more images comprises an image of the person across a frontal plane and/or an image of the person across a sagittal plane.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to illustrate various embodiments and to explain various principles and advantages in accordance with a present embodiment, by way of non-limiting example only.

Embodiments of the invention will be better understood and readily apparent to one of ordinary skill in the art from the following written description, by way of example only, and in conjunction with the drawings, in which.

Figure 1:
FIG. 1 shows a flow chart illustrating a method for estimating a body part position of a person according to various embodiments of the present disclosure.

A body part position relates to a position at which a body part is located. Detection of a body part position may utilize an image of an anterior view, a frontal view (e.g., an image of the person across a frontal plane) and/or a lateral view (e.g., an image of the person across a sagittal plane, such as a right and/or left lateral view) of a body of a person. Based on the image, each body part position may be identified and denoted by a respective landmark (e.g., anatomical point). Further, certain body part positions such as a position of a jugular notch, a position of a central ray of a person, a position of a mid chest of a person, or a position of a vertebrae along a spinal cord of the person may be estimated based on the detected body part positions. Based on detection and estimation of the body part positions, a posture condition of a person can be determined. A posture condition of a person relates to how a body part (e.g., shoulder, chin, hip, head, ear, eye brow, ankle, and other similar body parts) of the person deviates from a standard position (e.g., a reference position) of the body part. It can relate to a shift (e.g., left or right shift), tilt (e.g., upward or downward tilt), or rotation from the reference position. Any shift, tilt or rotation may be detected based on comparison of lines connecting and/or distances measured between the body part positions, as well as detection and calculation of angles derived from the comparison of lines. For example, a rotation of one or more body parts of the person around an upright centre axis of the person may be determined based on detecting an angle of a line connecting two body part positions against a reference line. The reference line may be another line connecting another two body part positions of the person. Different landmarks, lines and/or angles may be utilized depending on the body part of which a posture condition is to be determined.

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "detecting", "estimating", "comparing", "receiving", "calculating", "determining", "updating", "generating", "initializing", "outputting", "receiving", "retrieving", "identifying", "dispersing", "authenticating" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

EXAMPLE EMBODIMENT

Various embodiments of the present disclosure relate to a method and an apparatus for estimating a body part position of a person.

There is still lack for detection of anatomical landmarks, particularly for detecting positions of body parts such as the jugular notch, central ray, mid chest, and spinal cord vertebrae of a person based on a body image of the person. These body part positions are typically manually identified by clinicians, for example by palpation along a spinal cord of a person or located via radiography images. Thus, a system for assessing standing posture may include an anatomical landmarks detection system that seeks to solve the issues indicated above, and a posture analysis system. An example of the system is described in FIG. 2. The landmarks detection system is advantageously able to estimate positions of body parts such as the jugular notch, central ray, mid chest, and spinal cord vertebrae of a person based on a body image of the person.

FIG. 1 shows a flow chart 100 illustrating a method for estimating a body part position of a person according to various embodiments of the present disclosure. In step 102, a plurality of body part positions of a person is detected by a processor from an image in which the person is detected, wherein each of the plurality of body part positions corresponds to a body part of the person. In step 104, a body part position of the person is estimated by the processor based on the detected plurality of body part positions.

In an implementation, estimating the body part position may comprise estimating a position of a vertebrae along a spinal cord of the person or a position of a jugular notch of the person.

In an implementation, the method may comprise determining if the image in which the person is detected comprises an image of the person across a frontal plane, wherein estimating the body part position of the person is carried out in response to a result of the determination. The body part position being estimated may be a position of a jugular notch of the person, and estimating the body part position may comprise: determining, based on the detected plurality of body part positions, a position of each of a chin, left shoulder and right shoulder of the person: identifying a midpoint position between the positions of the left and right shoulder; calculating a distance from the position of the chin to the midpoint position; and estimating the position of the jugular notch based on the position of the chin and the calculated distance.

In an implementation, the method may further comprise: determining if the image in which the person is detected comprises an image of the person across a sagittal plane, wherein estimating the body part position of the person is carried out in response to a result of the determination. The body part position may be a position of the jugular notch of the person, and estimating the body part position may comprise: determining, based on the detected plurality of body part positions, a position of each of a chin and a shoulder of the person: identifying a midpoint position along a vertical line that starts from the position of the chin and ends at a horizontal line passing through the position of the shoulder; calculating a distance from the position of the shoulder to the midpoint position; calculating an angle between a line from the position of the shoulder to the midpoint position and the horizontal line passing through the position of the shoulder; and the position of the jugular notch based on the calculated distance and calculated angle. The method may further comprise estimating a position of a vertebrae along a spinal cord of the person based on the estimated position of the jugular notch and a relative distance between each vertebrae along the spinal cord.

Figure 2:
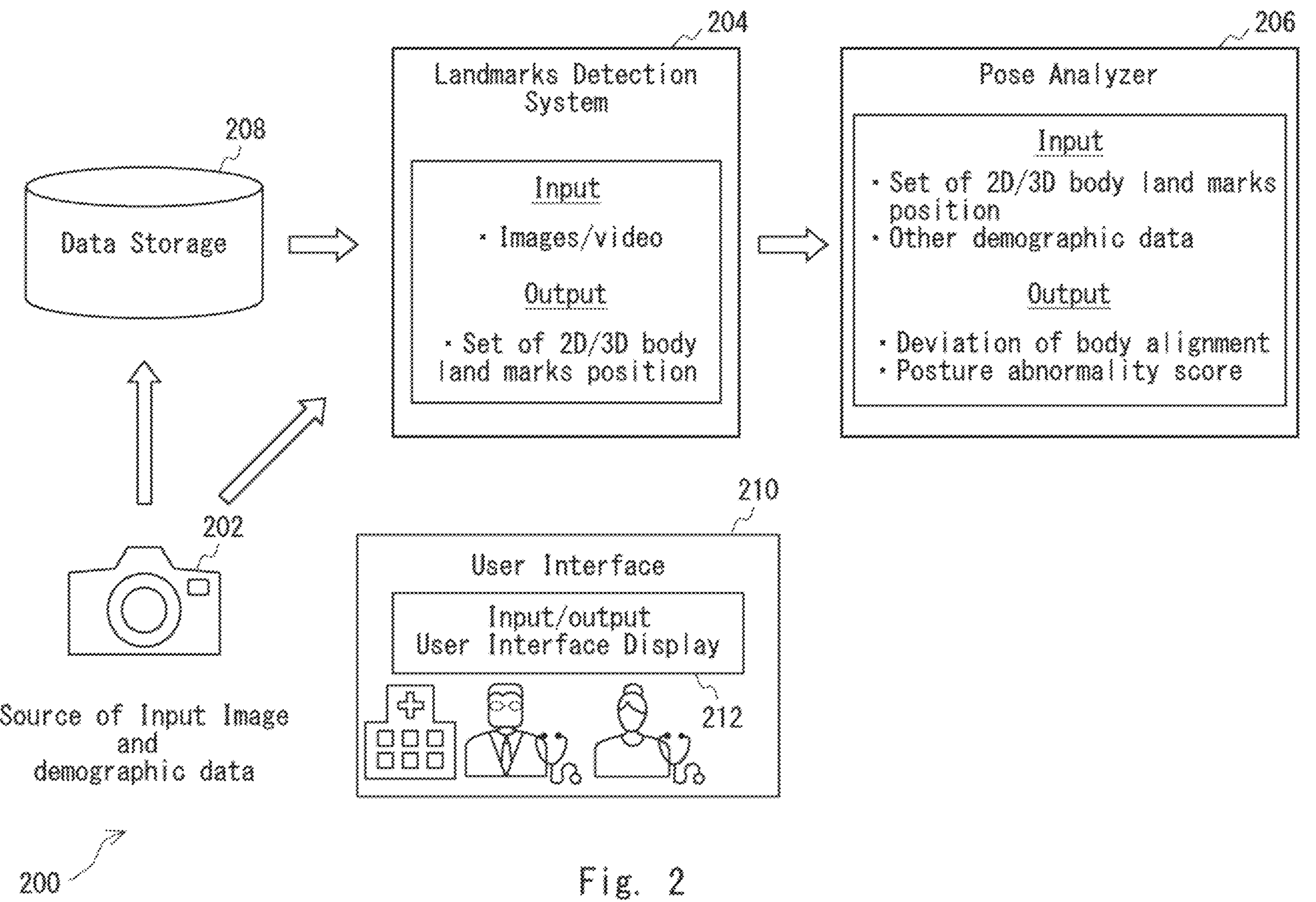
FIG. 2 shows a block diagram of an apparatus for estimating a body part position of a person according to an embodiment of the present disclosure.

FIG. 2 shows a block diagram of an apparatus 200 for estimating a body part position of a person according to an embodiment of the present disclosure. In an implementation, the apparatus 200 may be generally described as a physical device comprising at least one processor and at least one memory including computer program code. The at least one memory and the computer program code are configured to, with the at least one processor, cause the physical device to perform the operations described in FIG. 1.

In an implementation, the apparatus 200 may receive input videos or images (e.g., video frames or images of an anterior view, a frontal view and/or a lateral view of a body of a person, or other similar image) from a source 202. For example, the input image or video may be a newly taken image or video, or one from an existing image or video database, or one taken by a camera or stored in a device such as a smartphone, camera, or other similar device. In an example, an input video may be deconstructed into a plurality of still video image frames so that each video image frame may be analysed by the apparatus 200. The apparatus 200 may comprise a landmarks detection system 204 configured to determine a set of two-dimensional and/or three-dimensional body landmarks position from the input videos or images, and a pose analyzer 206 configured to determine a deviation of body alignment and/or a level of posture abnormality score (e.g., asymmetric score) based on the set of two-dimensional and/or three-dimensional body landmarks position as well as other demographic data as input. In an example, the landmarks detection system 204 may be configured to determine whether an image is an anterior view, posterior view or lateral view of a body of a person for determining the landmark positions, and may also be configured to estimate, based on the detected landmarks corresponding to a plurality of body part positions of a person, positions of further body parts such as the jugular notch, central ray, mid chest, and spinal cord vertebrae of the person. The landmarks detection system 204 is further described in FIGS. 3-16.

The apparatus 200 may be configured to display the received videos and/or images from the source 202 and/or inputs and outputs of the landmarks detection system 204, and pose analyzer 206 in a user interface 210. A user of the apparatus 200 may also interact with the user interface 210 with data input via an input/output interface display 212. It should be appreciated that each of the landmarks detection system 204 and pose analyzer 206 may be part of the apparatus 200, or a standalone device or part of another device and is in communication with the apparatus 200 through a connection. Such connection may be wired, wireless (e.g., via NFC communication, Bluetooth, etc.) or over a network (e.g., the Internet).

The apparatus may comprise a data storage 208 accessible by the apparatus 200 for storing videos and images from the source 202 as well as inputs and outputs of the landmarks detection system 204 and pose analyzer 206. While it is shown in FIG. 2 that the data storage is part of the apparatus 200, it should be appreciated that the data storage 208 may not form part of the apparatus 200 and is in communication with the apparatus 200 through a connection. Such connection may be wired, wireless (e.g., via NFC communication, Bluetooth, etc.) or over a network (e.g., the Internet) or over a cloud server. In another implementation, each of the landmarks detection system 204, pose analyzer 206, and the source 202 may comprise its own data storage for storing its input/output data.

In an implementation, a video or image (e.g., video frame or image of an anterior view, a frontal view and/or a lateral view of a body of a person, or other similar image) may be received and stored in data storage 208 before being used by landmarks detection system 204 as input, or directly sent to the landmarks detection system 204 as input without going through the data storage 208. The landmarks detection system 204 may determine a set of two-dimensional and/or three-dimensional body landmarks position from the input video or image, and a pose analyzer 206 may determine a deviation of body alignment and/or a level of posture abnormality score (e.g., asymmetric score) based on the set of two-dimensional and/or three-dimensional body landmarks position as well as other demographic data as input. Output of the landmarks detection system 204 and/or the pose analyzer 206 may then be displayed in an input/output user interface display of a user interface 210.

In an implementation, a system for estimating a body part position of a person may comprise the apparatus 200 and one or more image capturing apparatuses configured to capture one or more images of the person, wherein the one or more images comprises an image of the person across a frontal plane and/or an image of the person across a sagittal plane.

Figure 3:
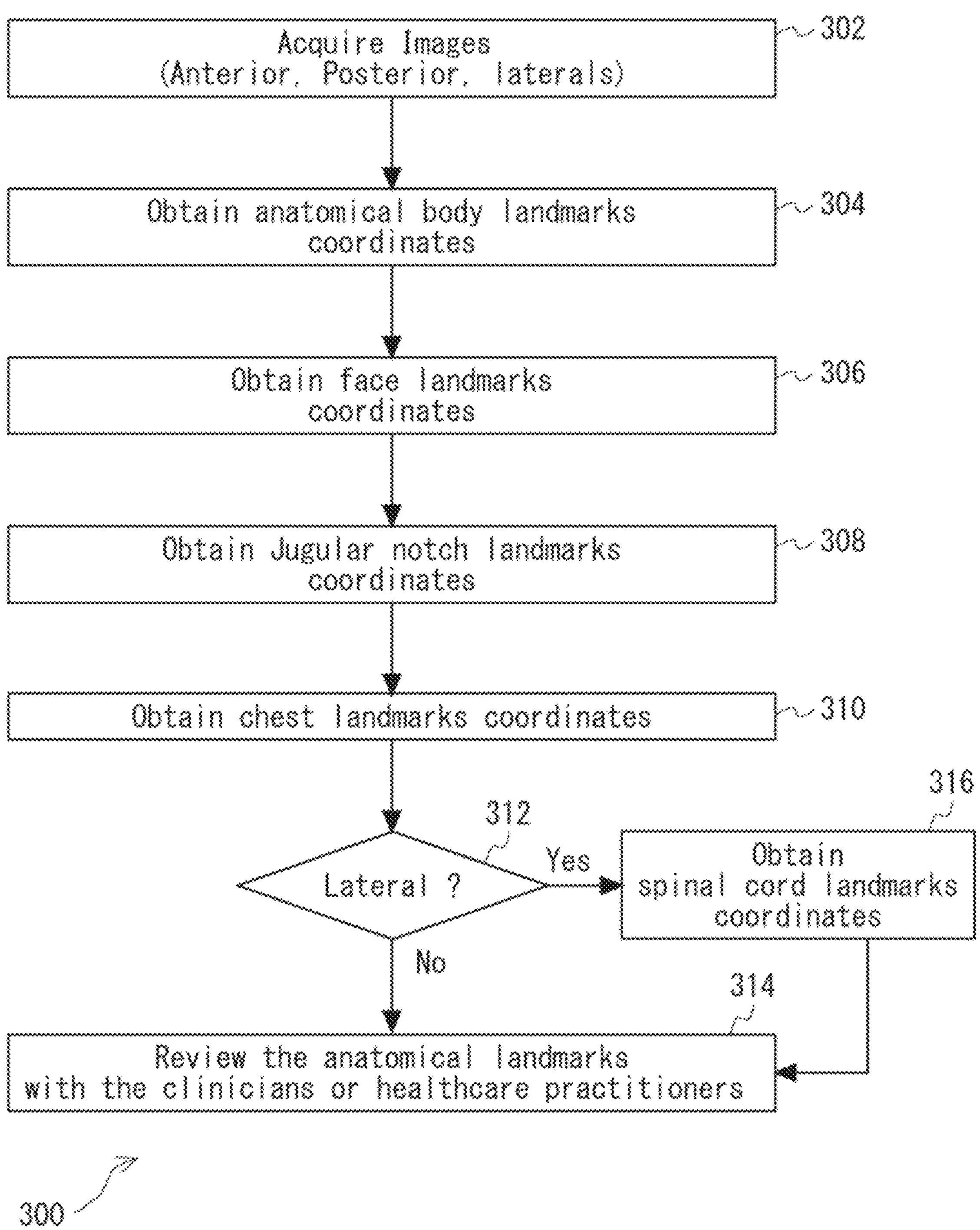
FIG. 3 shows a flowchart for a landmarks detection system according to an embodiment of the present disclosure.

FIG. 3 shows a flowchart 300 for a landmarks detection system according to an embodiment of the present disclosure. In a step 302, images of anterior, posterior and laterals of a body of a person may be acquired. In an example, it may be determined whether an acquired image is an anterior view, a frontal view (e.g., an image of the person across a frontal plane) and/or a lateral view (e.g., an image of the person across a sagittal plane, such as a right and/or left lateral view) of a body of a person. In an example where an input video is acquired, the video may be deconstructed into a plurality of still video image frames, and it may be determined whether each video image frame is an anterior, posterior or lateral view of a body of a person. In a step 304, anatomical landmarks (e.g., space coordinates for each landmark that represents a position of a corresponding body part) for each body part in the images may be obtained. In a step 306, face landmark coordinates may be obtained. For example, each of a plurality of body part positions may be detected and denoted by a respective landmark in steps 304 and 306. In step 304, positions of body parts such as the elbows, shoulders, hips, knees, ankles, toes, and other similar body parts of the person may be detected. In step 306, positions of body parts on the face such as the chin, ears and other similar parts of the face of the person may be detected. In a step 308, landmark coordinates for the jugular notch of the person may be obtained. For example, a position of the jugular notch may be estimated based on the detected positions of the chin and shoulders of the person. The process for obtaining the position of the jugular notch from a frontal view and a lateral view is further described in FIG. 6 and FIG. 7 respectively. In a step 310, landmark coordinates for the chest may be obtained. For example, a position of a central ray and mid chest of the person may be estimated based on the estimated position of the jugular notch of the person. The process for obtaining the position of the central ray and mid chest is further described in FIGS. 10 to 11C. In a step 312, it may be determined whether the acquired image is a lateral view of the body of the person. If it is not determined to be the case, the process proceeds to step 314 where the obtained anatomical landmarks may be reviewed with clinicians or healthcare practitioners, and then the process ends. Otherwise, the process proceeds to step 316 in which spinal cord landmark coordinates are obtained, and then to step 314 where the obtained anatomical landmarks (e.g., including the spinal cord landmark coordinates) may be reviewed with clinicians or healthcare practitioners, and then the process ends. For example, the spinal cord landmark coordinates (e.g., each landmark coordinate indicating a position of a vertebrae of the spinal cord of the person) may be estimated from a lateral view image of the person based on the estimated position of the mid chest of the person. The process for obtaining the positions of the vertebra of the spinal cord is further described in FIGS. 12 and 13.

Figure 4:
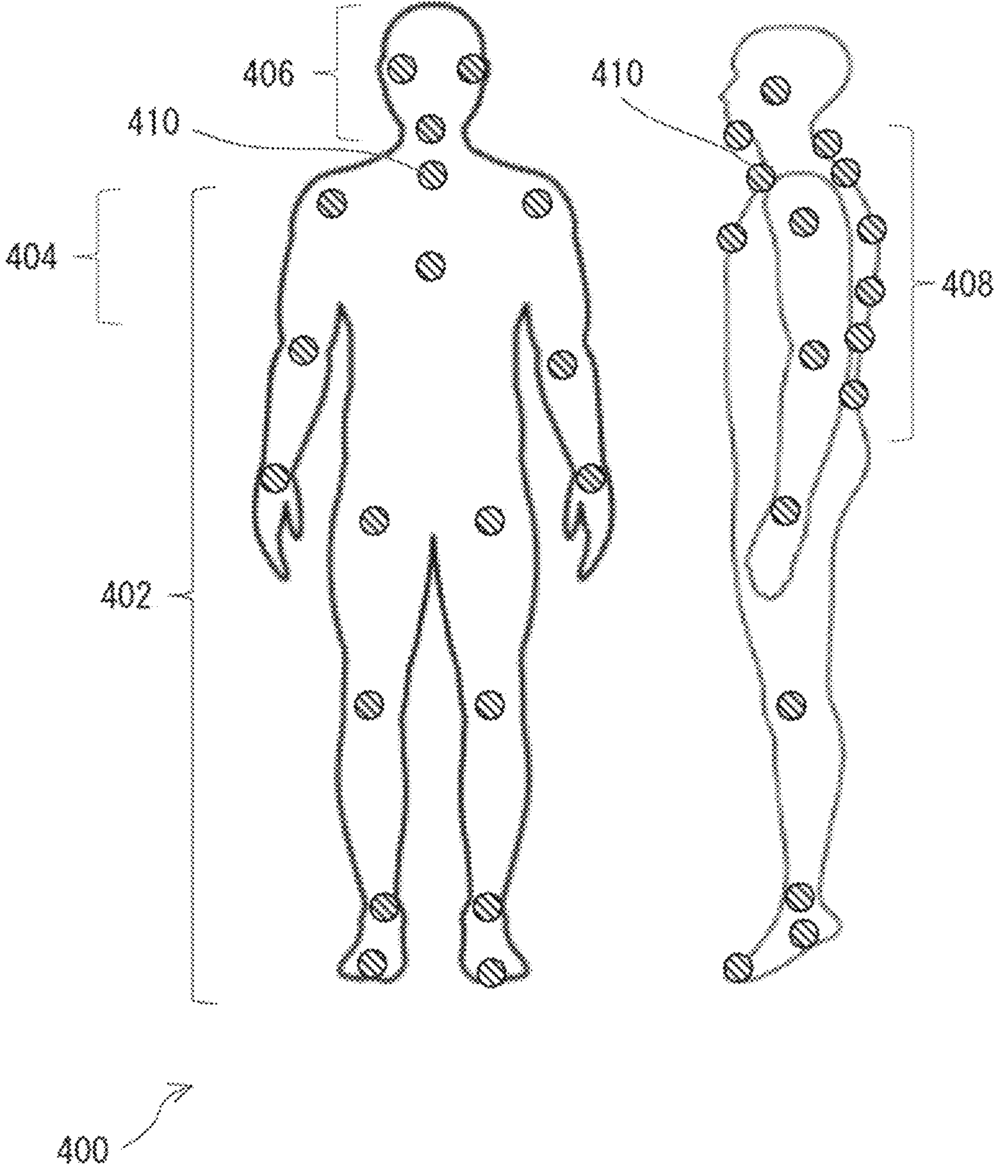
FIG. 4 shows an exemplary illustration for landmarks detection according to an embodiment of the present disclosure.
Figure 5:
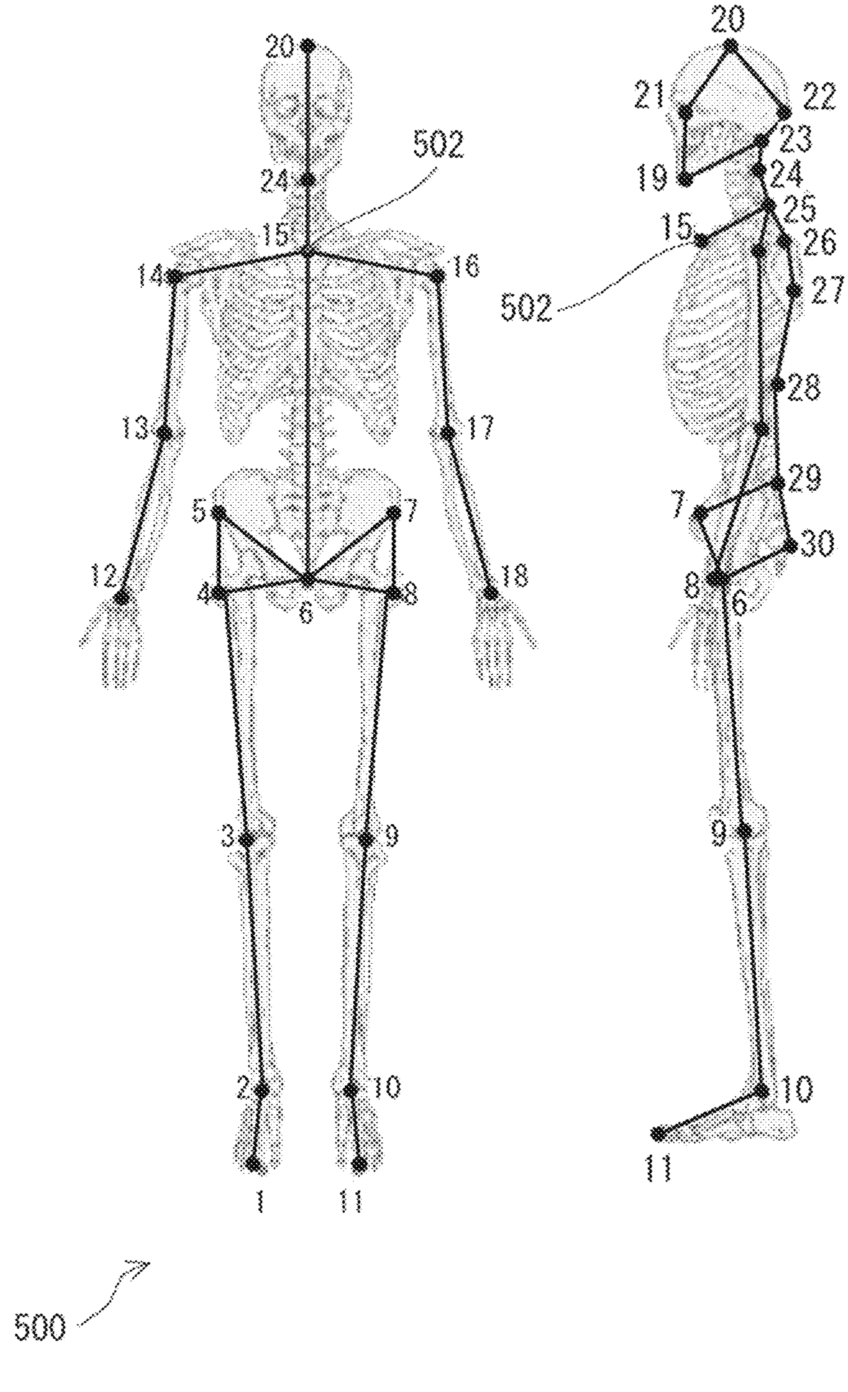
FIG. 5 shows another exemplary illustration for landmarks detection according to an embodiment of the present disclosure.

FIG. 4 shows an exemplary illustration 400 for landmarks detection according to an embodiment of the present disclosure. For example, with reference to flowchart 300, landmark coordinates for each body part in section 402 may be obtained in step 304. Landmark coordinates for face section 406 may be obtained in step 306. Landmark coordinates for chest section 404 may be obtained in step 310. Spinal landmark coordinates in spinal section 408 (e.g., which can be seen from a lateral view of a body of a person) may be obtained in step 316. Further, a landmark coordinate 410 denoting the jugular notch may be obtained in step 308.

In an example, open source body and face landmark detection engines such as MediaPipe holistic engine may be utilized to obtain the required anatomical landmark coordinates e.g., in steps 304 and 306 of flowchart 300. However, open source engines typically cannot provide some of the landmarks required by clinicians as shown in landmarks FIG. 500 of FIG. 5. For example, the landmark for the jugular notch as shown by reference 502 is typically manually provided by the clinicians. It will be appreciated that the required anatomical landmark coordinates may also be obtained by other non-open source proprietary landmark detection engines.

Figure 6:
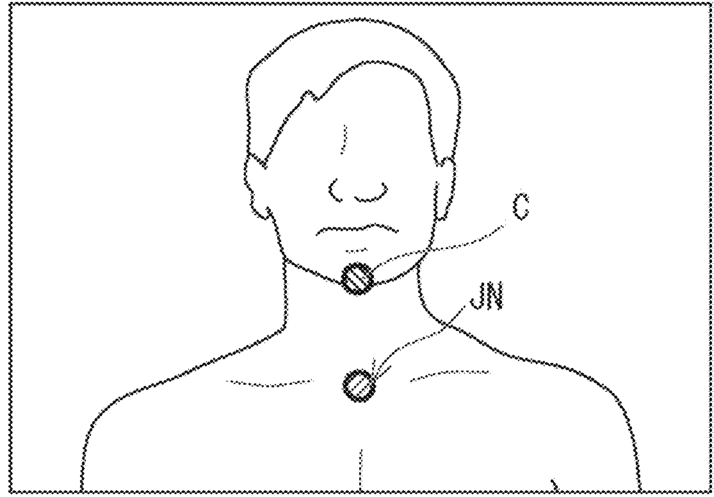
FIG. 6 shows an illustration for detection of jugular notch (JN) from a front view according to an embodiment of the present disclosure.
Figure 6:
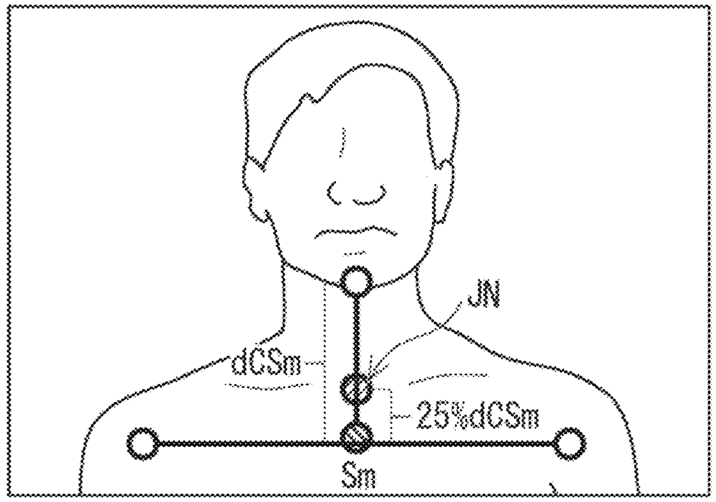
Figure 6:

FIG. 6 shows an illustration 600 for detection of jugular notch (JN) from a front view of a body of a person (e.g., an image of the person across a frontal plane) according to an embodiment of the present disclosure. A position of each of a chin, left shoulder and right shoulder of the person may be determined based on a plurality of body part positions that are detected, for example, in steps 304 and 306 of flowchart 300. For example, landmark coordinate of the chin (C) may be defined as C: [Cx, Cy] (obtained in, for example, step 306 of flowchart 300), and landmark coordinate of the shoulder midpoint (Sm) may be defined as Sm:[Smx, Smy] (e.g., identifying a midpoint position between the positions of the left and right shoulders, based on landmark coordinates corresponding to the left and right shoulders of the person obtained in, for example, step 304 of flowchart 300). Further, a distance from the position of the chin to the shoulder midpoint position may be calculated and defined as dCSm. The position of the jugular notch of the person may then be estimated based on the position of the chin and the calculated distance. For example, the landmark coordinate of the jugular notch may be defined as JN: [JNx, JNy]. Thus, based on the landmark coordinates of the chin, shoulders and midpoint, it can be determined that JNx is equivalent to Smx, and JNy is equivalent to Smy−25% dCSm.

Figure 7:
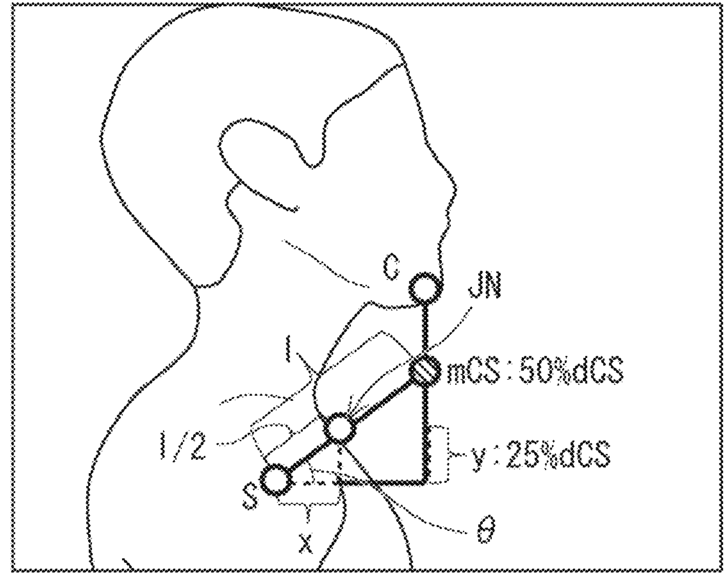
FIG. 7 shows an illustration for detection of jugular notch (JN) from a side view according to an embodiment of the present disclosure.
Figure 8:
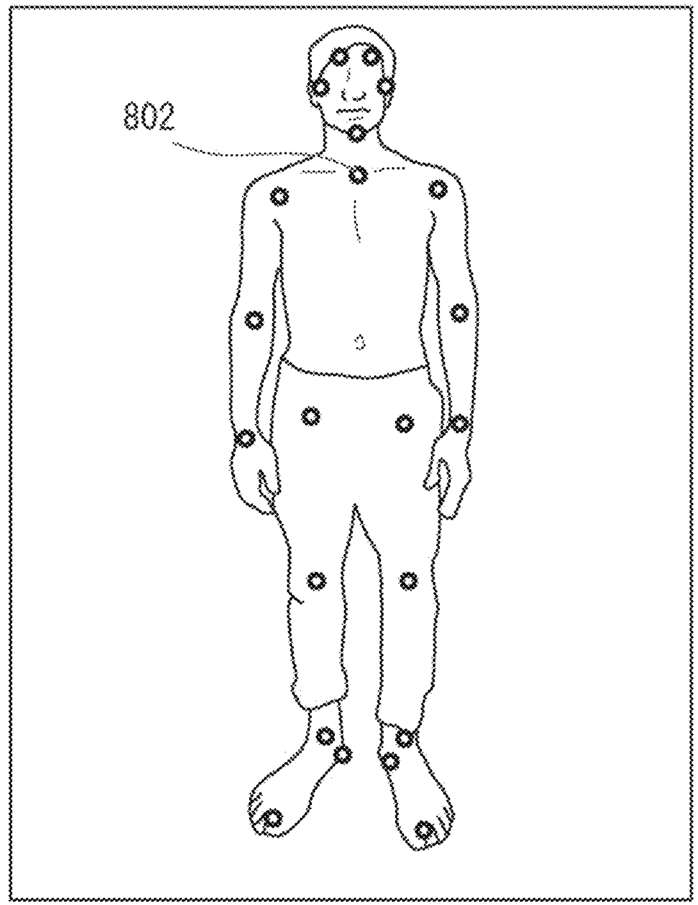
FIG. 8 shows an exemplary front-view illustration for detection of jugular notch (JN) according to an embodiment of the present disclosure.
Figure 8:
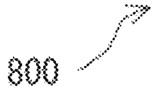
Figure 9:
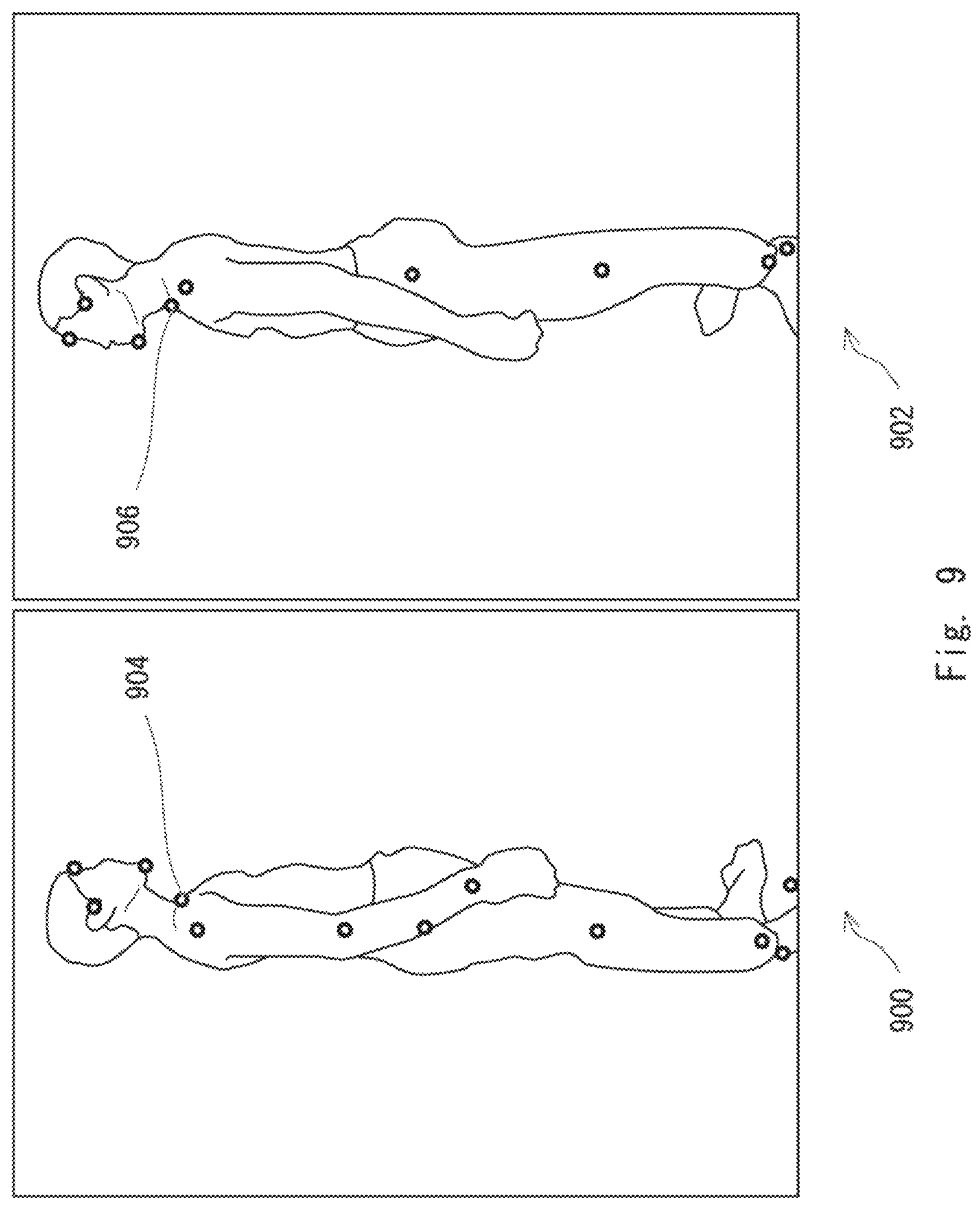
FIG. 9 shows exemplary side-view illustrations for detection of jugular notch (JN) according to an embodiment of the present disclosure.

Further, it is also possible to determine a position of the jugular notch from a side view of the body of the person (e.g., an image of the person across a sagittal plane) as shown in illustration 700 of FIG. 7. A position of each of a chin and left or right shoulder (depending on the side of the person that the image shows) of the person may be determined based on a plurality of body part positions that are detected, for example, in steps 304 and 306 of flowchart 300. A landmark coordinate of the shoulder (S) may be defined as S:[Sx, Sy] (e.g., based on landmark coordinates corresponding to the left or right shoulder of the person obtained in, for example, step 304 of flowchart 300). A midpoint position along a vertical line that starts from the position of the chin (e.g., landmark coordinates corresponding to the position of the chin obtained in, for example, step 306 of flowchart 300) and ends at a horizontal line passing through the position of the shoulder may be identified. The vertical distance from the position of the chin (C) to the horizontal line may be defined as dCS, 50% of this vertical distance (e.g., a distance from the position of the chin to the midpoint position) may be calculated and defined as mCS, a distance from the shoulder and the midpoint may be calculated and defined as 1, and 0 may be calculated and defined as an angle between a line from the position of the shoulder to the midpoint position and the horizontal line passing through the position of the shoulder (S). Based on the calculated distance I and calculated angle θ, the jugular notch (JN) can be detected and defined as JN: [JNx. JNy], in which JNx is equivalent to Sx±x, where x=cos(θ)*½, and JNy is equivalent to Sy−y, where y=25% dCS. Based on these techniques and calculations, it is possible to identify the jugular notch based on front view images (e.g., such as jugular notch landmark 802 from exemplary front view image 800 of FIG. 8) as well as from lateral view images (e.g., such as jugular notch landmarks 904 and 906 from exemplary lateral view images 900 and 902 of FIG. 9 respectively).

Figure 10:
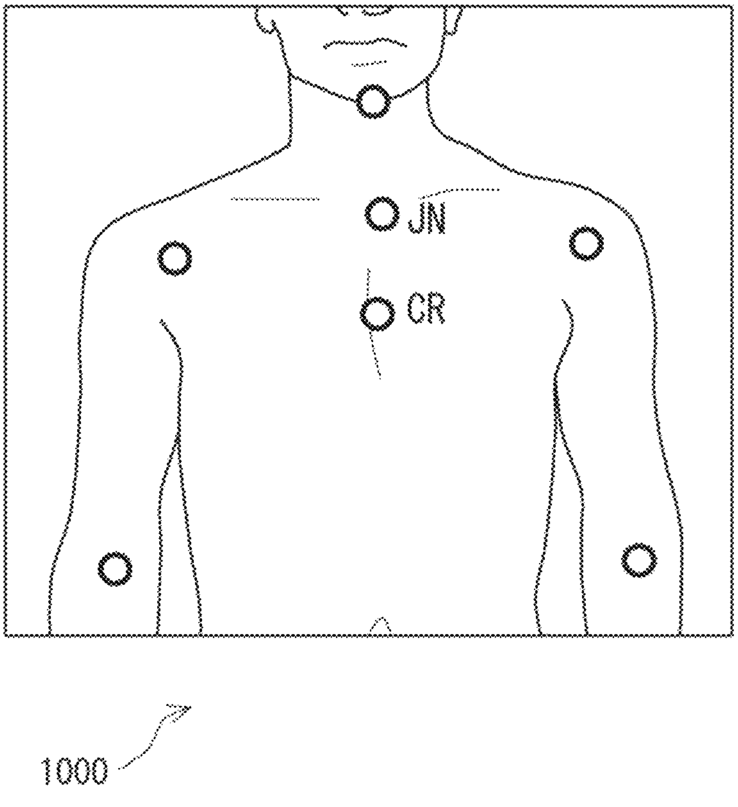
FIG. 10 shows a frontal view for identification of a central ray (CR) position based on a detected jugular notch (JN) according to an embodiment of the present disclosure.
Figure 11A:
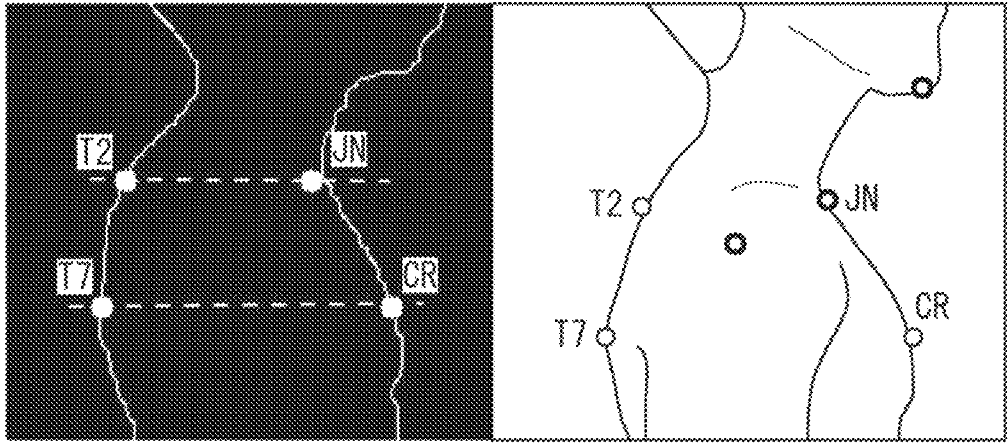
FIGS. 11A-11B show respectively a right lateral view and left lateral view for detection of central ray (CR) position, chest and mid-chest (e.g., T7) according to an embodiment of the present disclosure.
Figure 11A:
Figure 11B:
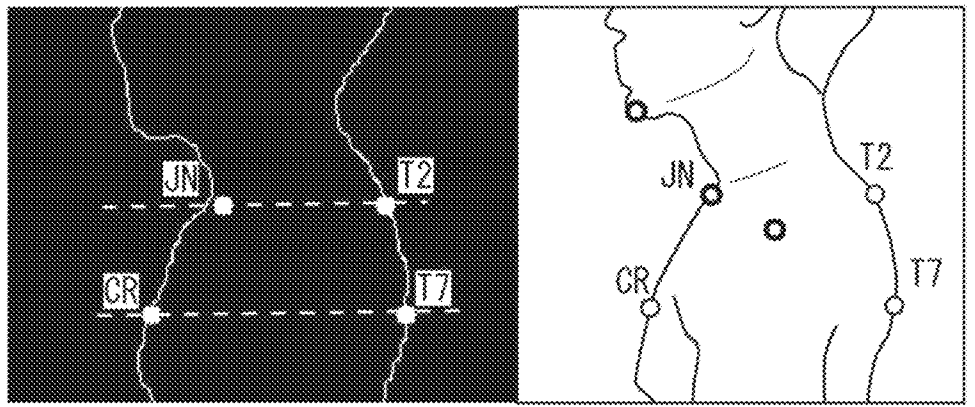
Figure 11B:

FIG. 10 shows a frontal view for identification of a central ray (CR) position based on a detected jugular notch (JN) according to an embodiment of the present disclosure. Based on the jugular notch (JN), a central ray (CR) position may be computed, wherein the central ray position may be 3-4 inches (e.g., 8-10 cm) below the position of the jugular notch. A mirror image of the CR position or mid chest or T7 may be detected using right lateral view 1100 and/or left lateral view 1102 of a body of a person for detection of a central ray (CR) position, chest and mid-chest (e.g., T7) based on the jugular notch (JN) in FIG. 11A and FIG. 11B. For example, a landmark used for positioning the central ray (CR) is at T7 (e.g., the mid thorax). The level of the T7 may be 3-4 inches (e.g., 8-10 cm) below the jugular notch.

Figure 12:
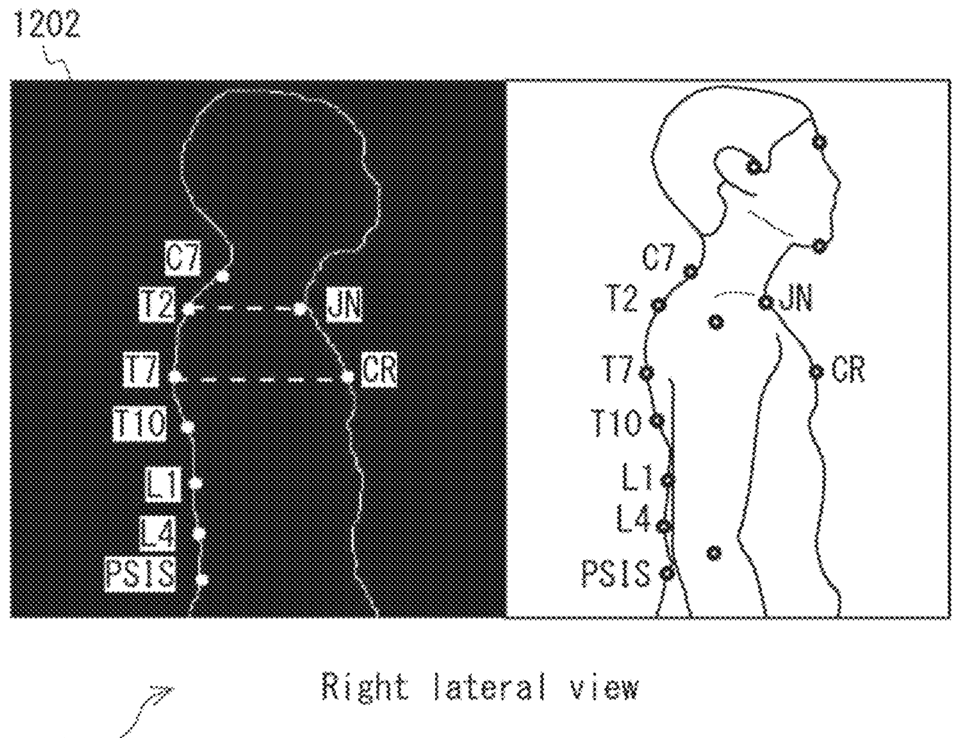
FIG. 12 shows a right lateral view for estimation of cervical (C7), thoracic (T2, T7, T10), lumbar (L1 and L4) and Sacral (S2) vertebrae position of spinal cord according to an embodiment of the present disclosure.
Figure 13:
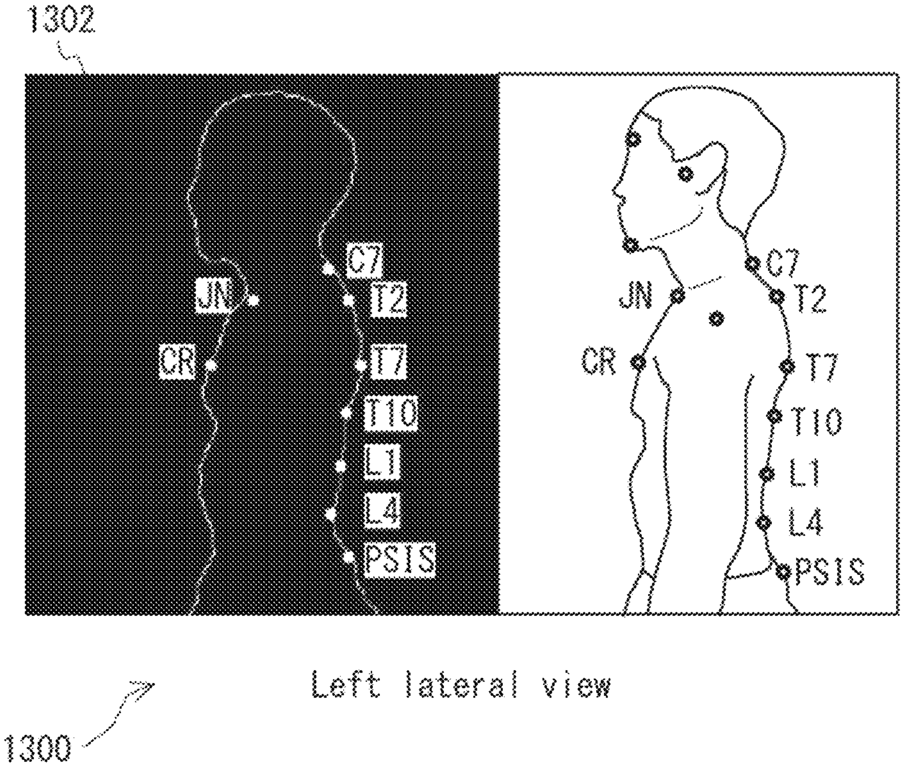
FIG. 13 shows a left lateral view for estimation of cervical (C7), thoracic (T2, T7, T10), lumbar (L1 and L4) and Sacral (S2) vertebrae position of spinal cord according to an embodiment of the present disclosure.

FIGS. 12 and 13 show respectively a right lateral view 1200 and left lateral view 1300 for estimation of cervical (C7), thoracic (T2, T7, T10), lumbar (L1 and L4) and sacral (S2) vertebrae positions of a spinal cord according to an embodiment of the present disclosure. A position of a vertebrae along a spinal cord of the person may be estimated based on the estimated position of the mid chest of the person and a relative distance between each vertebrae along the spinal cord. For example, based on the approximate distance between T7 and C7, and prior research on the ratio of thoracic and posterior superior iliac spine (PSIS) by Ernst et al., C7, T2, T7, T10, L1, L4 and S2 (PSIS) positions may be estimated using the lateral view images 1200 and 1300. In an example, a flexible ruler may also be placed on a back of a person for determining the distances between the various segments of the spinal cord. The estimated distance may be utilized for calculating a percentage position on a distance throughout the segments from C7 to PSIS.

Figure 14:
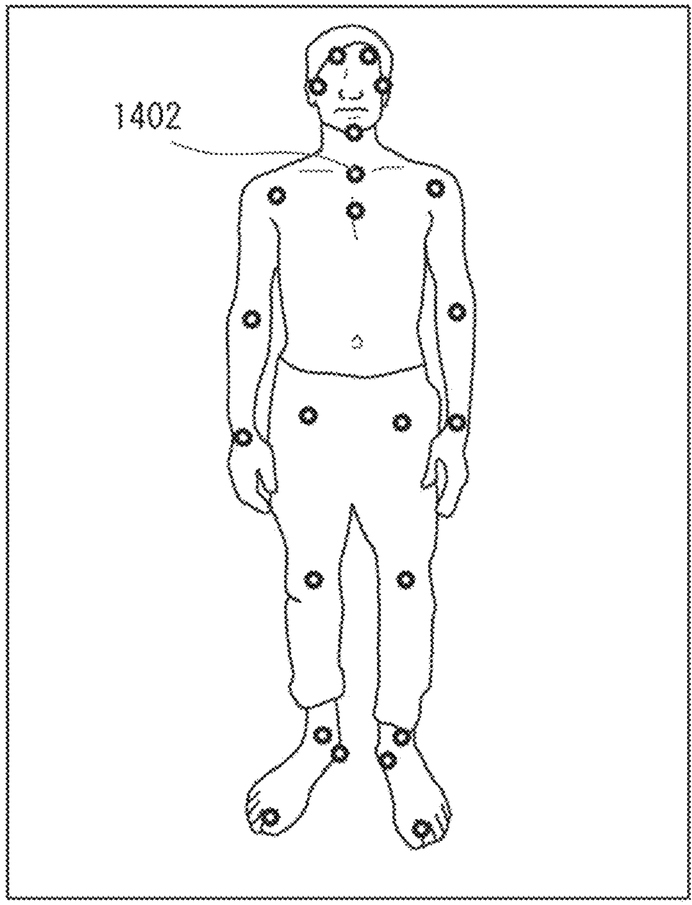
FIG. 14 shows an anterior/frontal view with detected whole body landmarks according to an embodiment of the present disclosure.
Figure 14:
Figure 15A:
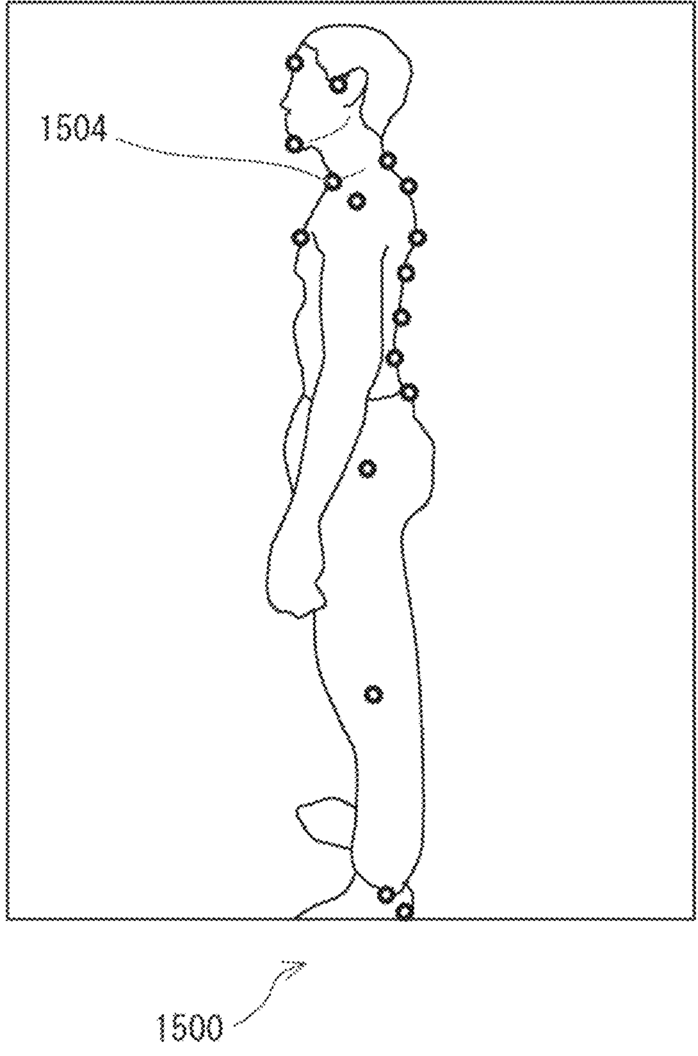
FIGS. 15A-15B show respectively a left lateral view and right lateral view with detected whole body landmarks according to an embodiment of the present disclosure.
Figure 15B:
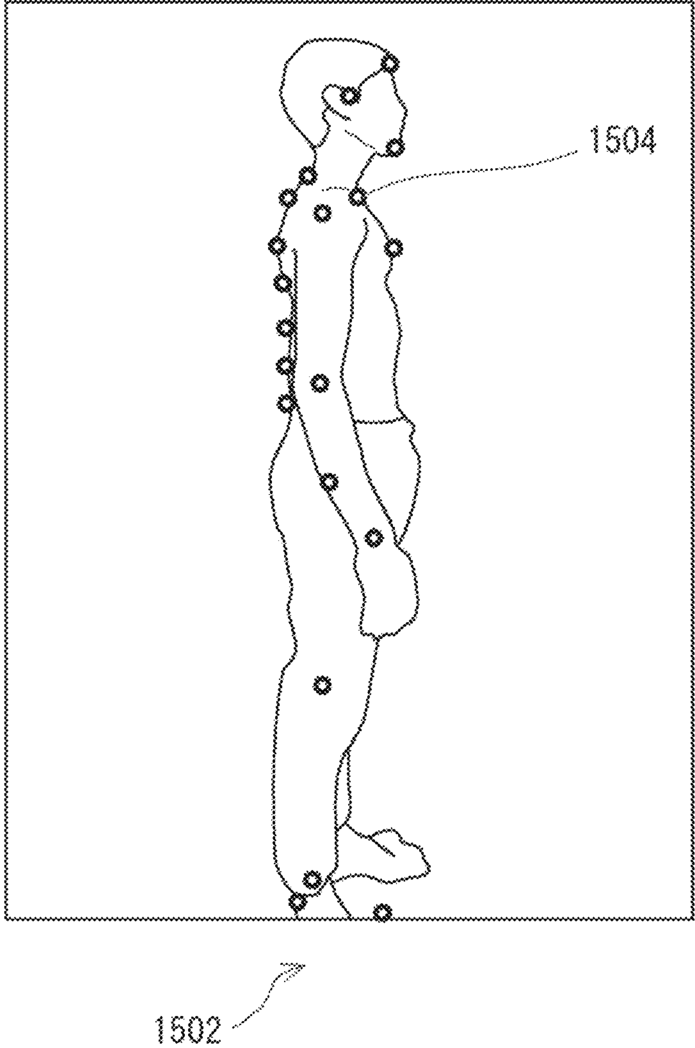

FIGS. 14, 15A and 15B show respectively results of the landmarks detection system from an anterior/frontal view image 1400, left lateral view image 1500 and right lateral view image 1502 according to an embodiment of the present disclosure, each landmark denoting a body part and represented by a dot on the body of the person in the images. For example, the jugular notch of the person is denoted by a landmark 1402 in the image 1400, and by a landmark 1504 in images 1500 and 1502. Further results of the landmarks detection system are also shown in body edge image 1202 of FIG. 12 and body 5 edge image 1302 of FIG. 13 in which, based on detected landmarks for a whole body of a person in for example images 1500 and 1502, the landmarks that are detected for the spinal cord may be selected and displayed on a body edge image 1202 and 1302 respectively e.g., the detected spinal cord landmarks being shown as white dots in the body edge images 1202 and 1302.

Figure 16:
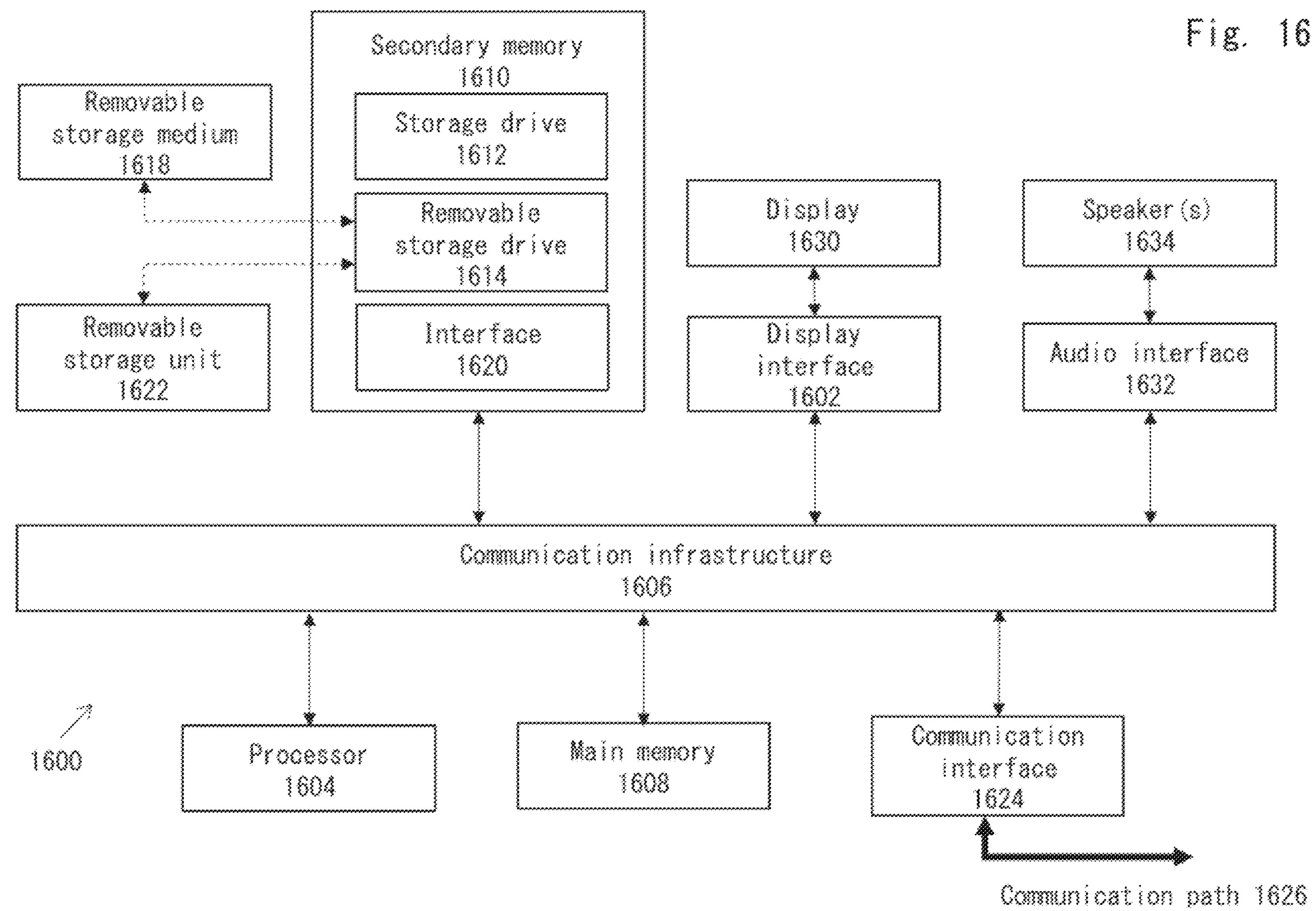
FIG. 16 shows a schematic diagram of an exemplary computing device suitable for use to execute the method in FIG. 1.

FIG. 16 depicts an exemplary computing device 1600, hereinafter interchangeably referred to as a computer system 1600, where one or more such computing devices 1600 may be used to execute the method of FIG. 1. The exemplary computing device 1600 can be used to implement the apparatus 200 shown in FIG. 2. The following description of the computing device 1600 is provided by way of example only and is not intended to be limiting.

As shown in FIG. 16, the example computing device 1600 includes a processor 1604 for executing software routines. Although a single processor is shown for the sake of clarity, the computing device 1600 may also include a multi-processor system. The processor 1604 is connected to a communication infrastructure 1606 for communication with other components of the computing device 1600. The communication infrastructure 1606 may include, for example, a communications bus, cross-bar, or network.

The computing device 1600 further includes a main memory 1608, such as a random access memory (RAM), and a secondary memory 1610. The secondary memory 1610 may include, for example, a storage drive 1612, which may be a hard disk drive, a solid state drive or a hybrid drive and/or a removable storage drive 1614, which may include a magnetic tape drive, an optical disk drive, a solid state storage drive (such as a USB flash drive, a flash memory device, a solid state drive or a memory card), or the like. The removable storage drive 1614 reads from and/or writes to a removable storage medium 1618 in a well-known manner. The removable storage medium 1618 may include magnetic tape, optical disk, non-volatile memory storage medium, or the like, which is read by and written to by removable storage drive 1614. As will be appreciated by persons skilled in the relevant art(s), the removable storage medium 1618 includes a computer readable storage medium having stored therein computer executable program code instructions and/or data.

In an alternative implementation, the secondary memory 1610 may additionally or alternatively include other similar means for allowing computer programs or other instructions to be loaded into the computing device 1600. Such means can include, for example, a removable storage unit 1622 and an interface 1620. Examples of a removable storage unit 1622 and interface 1620 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 1622 and interfaces 1620 which allow software and data to be transferred from the removable storage unit 1622 to the computer system 1600.

The computing device 1600 also includes at least one communication interface 1624. The communication interface 1624 allows software and data to be transferred between computing device 1600 and external devices via a communication path 1626. In various embodiments of the inventions, the communication interface 1624 permits data to be transferred between the computing device 1600 and a data communication network, such as a public data or private data communication network. The communication interface 1624 may be used to exchange data between different computing devices 1600 which such computing devices 1600 form part an interconnected computer network. Examples of a communication interface 1624 can include a modem, a network interface (such as an Ethernet card), a communication port (such as a serial, parallel, printer, GPIB, IEEE 1394, RJ45, USB), an antenna with associated circuitry and the like. The communication interface 1624 may be wired or may be wireless. Software and data transferred via the communication interface 1624 are in the form of signals which can be electronic, electromagnetic, optical or other signals capable of being received by communication interface 1624. These signals are provided to the communication interface via the communication path 1626.

As shown in FIG. 16, the computing device 1600 further includes a display interface 1602 which performs operations for rendering images to an associated display 1630 and an audio interface 1632 for performing operations for playing audio content via associated speaker(s) 1634.

As used herein, the term "computer program product" may refer, in part, to removable storage medium 1618, removable storage unit 1622, a hard disk installed in storage drive 1612, or a carrier wave carrying software over communication path 1626 (wireless link or cable) to communication interface 1624. Computer readable storage media refers to any non-transitory, non-volatile tangible storage medium that provides recorded instructions and/or data to the computing device 1600 for execution and/or processing. Examples of such storage media include magnetic tape, CD-ROM, DVD, Blu-ray Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 1600. Examples of transitory or non-tangible computer readable transmission media that may also participate in the provision of software, application programs, instructions and/or data to the computing device 1600 include radio or infra-red transmission channels as well as a network connection to another computer or networked device, and the Internet or Intranets including e-mail transmissions and information recorded on Websites and the like.

The computer programs (also called computer program code) are stored in main memory 1608 and/or secondary memory 1610. Computer programs can also be received via the communication interface 1624. Such computer programs, when executed, enable the computing device 1600 to perform one or more features of embodiments discussed herein. In various embodiments, the computer programs, when executed, enable the processor 1604 to perform features of the above-described embodiments. Accordingly, such computer programs represent controllers of the computer system 1600.

Software may be stored in a computer program product and loaded into the computing device 1600 using the removable storage drive 1614, the storage drive 1612, or the interface 1620. The computer program product may be a non-transitory computer readable medium. Alternatively, the computer program product may be downloaded to the computer system 1600 over the communications path 1626. The software, when executed by the processor 1604, causes the computing device 1600 to perform the necessary operations to execute the method as shown in FIG. 1.

It is to be understood that the embodiment of FIG. 16 is presented merely by way of example to explain the operation and structure of the apparatus 200. Therefore, in some embodiments one or more features of the computing device 1600 may be omitted. Also, in some embodiments, one or more features of the computing device 1600 may be combined together. Additionally, in some embodiments, one or more features of the computing device 1600 may be split into one or more component parts.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A method for estimating a body part position of a person comprising:

detecting, by a processor, a plurality of spatial coordinates representing body part positions of the person from an image in which the person is detected, wherein each of the plurality of spatial coordinates representing body part positions corresponds to a body part of the person; and estimating, by the processor, a spatial coordinate representing a body part position of the person based on the detected plurality of spatial coordinates representing body part positions, wherein the method is further comprises determining if the image in which the person is detected comprises an image of the person across a frontal plane, and wherein the body part position being estimated is a position of a jugular notch of the person, and based on the image comprising the image of the person across the frontal plane, estimating the spatial coordinate representing the body part position comprises:

determining, based on the detected plurality of spatial coordinates representing body part positions, a spatial coordinate representing a position of each of a chin, left shoulder and right shoulder of the person;

identifying a midpoint coordinate between the spatial coordinates representing the positions of the left and right shoulder;

calculating a distance from the spatial coordinate representing the position of the chin to the midpoint coordinate; and estimating a spatial coordinate representing the position of the jugular notch based on the spatial coordinate representing the position of the chin and the calculated distance.

2. The method of claim 1, further comprising:

determining if the image in which the person is detected comprises an image of the person across a sagittal plane.

3. The method of claim 2, wherein based on the image comprising the image of the person across the sagittal plane, estimating the spatial coordinate representing the body part position comprises:

determining, based on the detected plurality of spatial coordinates representing the body part positions, a spatial coordinate representing a position of each of a chin and a shoulder of the person;

identifying a second midpoint coordinate along a vertical line that starts from the spatial coordinate representing the position of the chin and ends at a horizontal line passing through the spatial coordinate representing the position of the shoulder;

calculating a distance from the spatial coordinate representing the position of the shoulder to the second midpoint coordinate;

calculating an angle between a line from the spatial coordinate representing the position of the shoulder to the second midpoint coordinate and the horizontal line passing through the spatial coordinate representing the position of the shoulder; and estimating the spatial coordinate representing the position of the jugular notch based on the calculated distance and calculated angle.

4. The method of claim 3, further comprising:

estimating a spatial coordinate representing a position of a vertebrae along a spinal cord of the person based on the estimated spatial coordinate representing the position of the jugular notch and a relative distance between each vertebrae along the spinal cord.

5. An apparatus for estimating a body part position of a person, the apparatus comprising:

at least one processor; and at least one memory including computer program code;

the at least one memory and the computer program code configured to, with at least one processor, cause the apparatus at least to:

detect a plurality of spatial coordinates representing body part positions of the person from an image in which the person is detected, wherein each of plurality of spatial coordinates representing body part positions corresponds to a body part of the person; and estimate a spatial coordinate representing a body part position of the person based on one or more of the detected plurality of spatial coordinates representing body part positions, wherein the at least one memory and the computer program code configured to, with at least one processor, cause the apparatus at least to further determine if the image in which the person is detected comprises an image of the person across a frontal plane, and wherein the body part position being estimated is a position of a jugular notch of the person, and based on the image comprising the image of the person across the frontal plane, estimating the spatial coordinate representing the body part position comprises:

determining, based on the detected plurality of spatial coordinates representing body part positions, a spatial coordinate representing a position of each of a chin, left shoulder and right shoulder of the person;

identifying a midpoint coordinate between the spatial coordinates representing the positions of the left and right shoulder;

calculating a distance from the spatial coordinate representing the position of the chin to the midpoint coordinate; and estimating a spatial coordinate representing the position of the jugular notch based on the spatial coordinate representing the position of the chin and the calculated distance.

6. The apparatus of claim 5, wherein the at least one memory and the computer program code configured to, with at least one processor, cause the apparatus at least to further:

determine if the image in which the person is detected comprises an image of the person across a sagittal plane.

7. The apparatus of claim 6, wherein, based on the image comprising the image of the person across the sagittal plane, estimating the spatial coordinate representing the body part position comprises:

determining, based on the detected plurality of spatial coordinates representing the body part positions, a spatial coordinate representing a position of each of a chin and a shoulder of the person;

identifying a second midpoint coordinate along a vertical line that starts from the spatial coordinate representing the position of the chin and ends at a horizontal line passing through the spatial coordinate representing the position of the shoulder;

calculating a distance from the spatial coordinate representing the position of the shoulder to the second midpoint coordinate;

calculating an angle between a line from the spatial coordinate representing the position of the shoulder to the second midpoint coordinate and the horizontal line passing through the spatial coordinate representing the position of the shoulder; and estimating the spatial coordinate representing the position of the jugular notch based on the calculated distance and calculated angle.

8. The apparatus of claim 7, wherein the at least one memory and the computer program code configured to, with at least one processor, cause the apparatus at least to further:

estimate a spatial coordinate representing a position of a vertebrae along a spinal cord of the person based on the estimated spatial coordinate representing the position of the jugular notch and a relative distance between each vertebrae along the spinal cord.

9. A system for estimating a body part position of a person comprising the apparatus of claim 5 and one or more image capturing apparatuses configured to capture one or more images of the person, wherein the one or more images comprises an image of the person across a frontal plane and/or an image of the person across a sagittal plane.

* * * * *